J. W. WILKINS.
AUTOMOBILE TOOL.
APPLICATION FILED SEPT. 12, 1919.
1,339,612.
Patented May 11, 1920.
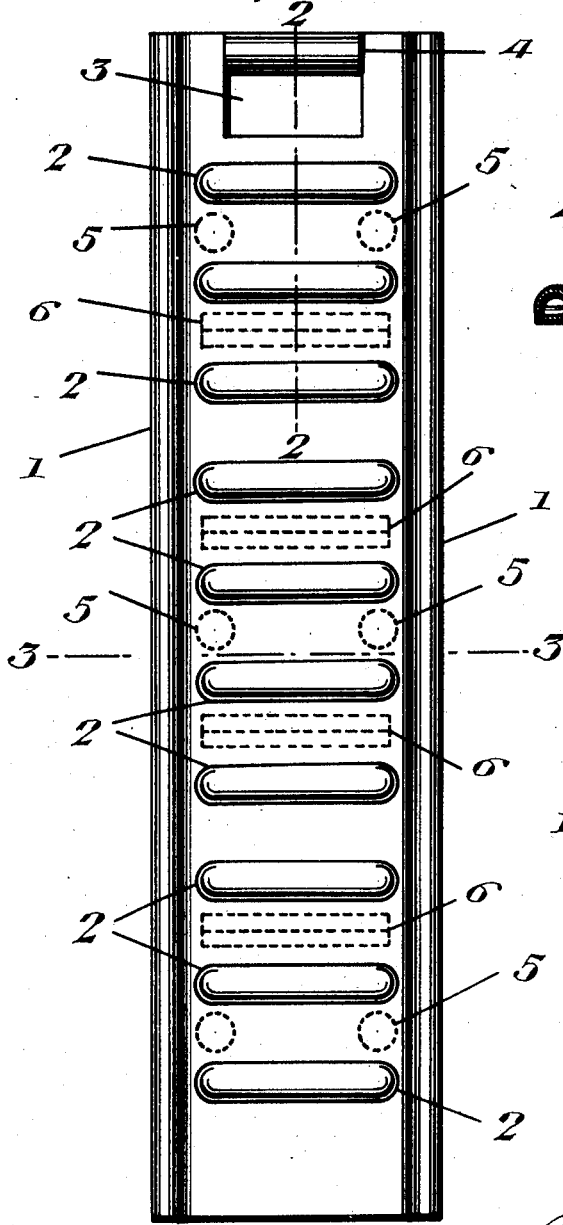
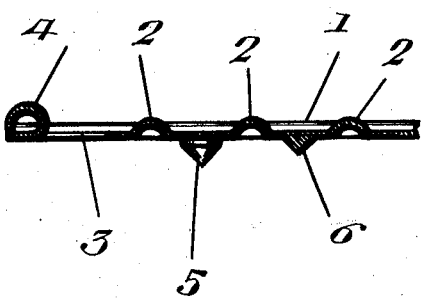
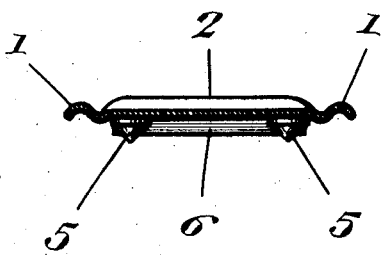
WITNESS:
INVENTOR.
John W. Wilkins
BY
Alexander Powell
ATTORNEYS

UNITED STATES PATENT OFFICE.

JOHN W. WILKINS, OF BATTLE CREEK, MICHIGAN.

AUTOMOBILE-TOOL.

1,339,612.　　　　　Specification of Letters Patent.　　Patented May 11, 1920.

Application filed September 12, 1919. Serial No. 323,356.

*To all whom it may concern:*

Be it known that I, JOHN W. WILKINS, a citizen of the United States, residing at Battle Creek, in the county of Calhoun and State of Michigan, have invented certain new and useful Improvements in Automobile-Tools; and I hereby declare that the following is a full, clear, and exact description thereof, reference being had to the accompanying drawings, which form part of this specification.

This invention is a tool or implement for use by automobilists. The object of the invention is to provide a novel tool that can be used as a support for an automobile jack when used on sand or soft ground, where the jack would sink into the ground when the weight of car is on it; also as a shovel for digging out auto wheels when in deep sand or snow; and also as a ladder or track for the wheels to climb upon and out of deep sand, soft earth, or snow.

I will explain the invention with reference to the accompanying drawings, which illustrate a practical form of the tool and will enable others to construct and use the same; and set forth in the claims the essential features of the tool for which protection is desired.

Figure 1 is a top plan view of the complete tool.

Fig. 2 is a detail longitudinal sectional view on the line 2—2, Fig. 1.

Fig. 3 is a transverse sectional view on the line 3—3, Fig. 1.

The tool may be pressed out of sheet metal, or cast. It is preferably made of sheet steel, and is approximately six inches in width and twenty-four inches in length. The tool is formed with longitudinal strengthening beads or ribs 1 on its opposite sides to stiffen it longitudinally; and with intermediate transversely disposed corrugations 2. Preferably the ribs and corrugations are convex on the upper side and concave on the under side. These ribs and corrugations, however, may be of other desired shape and arrangement; and the corrugations together form gripping surfaces or projections on the upper side of the tool which enables the tire of an automobile wheel to readily take hold on the tool when the latter is laid in front of such wheel.

At one end of the tool, intermediate the side ribs 1 is a hand piece 4, preferably formed by partially detaching a piece of the metal from the body of the tool and then bending such piece back upon itself, forming an opening 3 in the tool to accommodate the hand; and the partially detached bent portion forms a handle which can be conveniently and comfortably gripped by the hand of the operator when the tool is to be used as a shovel or spade.

The tool is preferably provided on its under side with means to grip the ground to prevent the tool slipping thereon. The gripping devices may be formed in various ways. As shown, the tool has calks 5, which may be formed in any suitable way—with or separately from the tool—and may be riveted or welded to the under side of the tool; six such calks are shown arranged in pairs at different points in the length of the tool. The tool may also be provided with transversely disposed cleats 6 on its under side, which may be formed with or separately from the tool in any suitable way, and may be riveted, brazed or welded to the tool. Either or both cleats and calks may be used, as preferred. Such devices will firmly grip the ground, and prevent the tool slipping longitudinally when it is used as a base or support for a jack, or as a ladder or track for an automobile wheel.

This tool provides a broad substantial foundation for a jack when used on soft ground or snow. It may also be used as a shovel for digging out wheels sunk in soft ground, sand, or snow. Placed under or in front of a wheel the tool provides a tractive foundation or track for the wheel so that cars may be readily driven thereon out of soft ground, loose sand, or snow.

This tool can be readily carried in an automobile, and its utility will be readily appreciated.

I claim:—

1. A tool for the purpose described comprising a substantially flat metal plate of greater length than breadth having longitudinal stiffening ribs at each side; and corrugations between the ribs and spaced therefrom; substantially as described.

2. An automobile tool for the purpose described comprising a metal plate of greater length than breadth having longitudinal stiffening ribs at each side; transverse corrugations between the ribs; and a handle opening at one end, substantially as described.

3. A tool for the purpose described comprising a substantially flat metal plate of greater length than breadth having longitudinal stiffening ribs and corrugations between the ribs, and an integral partially detached portion at one end bent back to form an opening for the fingers and a handle at the outer side of the opening, substantially as described.

4. An automobile tool for the purpose described comprising a metal plate of greater length than breadth having longitudinal stiffening ribs at each side; corrugations between the ribs; an integral partially detached portion at one end bent to form an opening and a handle; and means on the under side of the tool to prevent longitudinal slipping thereof, substantially as described.

5. An automobile tool for the purpose described comprising a sheet metal plate of greater length than breadth having longitudinal concavo-convex stiffening ribs at each side; transversely disposed concavo-convex portions between the ribs; and an integral partially detached portion at one end bent back to form an opening and a handle, substantially as described.

6. A tool for the purpose described comprising a metal plate of greater length than breadth having longitudinal stiffening ribs and corrugations between the ribs; and an integral partially detached portion at one end bent back to form an opening and a handle; with means on the under side of the tool to prevent longitudinal slipping thereof, substantially as described.

7. A tool for the purpose described comprising a metal plate of greater length than breadth having longitudinal stiffening ribs and corrugations between the ribs, and an integral partially detached portion at one end bent back to form an opening and a handle; with transversely disposed cleats attached to the under side of the tool to prevent longitudinal slipping thereof, substantially as described.

8. An automobile tool for the purpose described comprising a metal plate of greater length than breadth having longitudinal stiffening ribs at each side; corrugations between the ribs; an integral portion at one end bent to form a handle, and means on the under side of the tool to prevent longitudinal slipping thereof; with means attached to the under side of the tool to prevent longitudinal slipping thereof, substantially as described.

9. An automobile tool for the purpose described comprising a sheet metal plate of greater length than breadth having longitudinal concavo-convex stiffening ribs at each side; transversely disposed concavo-convex portions between the ribs; and an integral partially detached portion at one end bent back to form an opening and a handle; with transversely disposed cleats on the under side of the tool to prevent longitudinal slipping thereof, substantially as described.

In testimony that I claim the foregoing as my own, I affix my signature.

JOHN W. WILKINS.